UNITED STATES PATENT OFFICE.

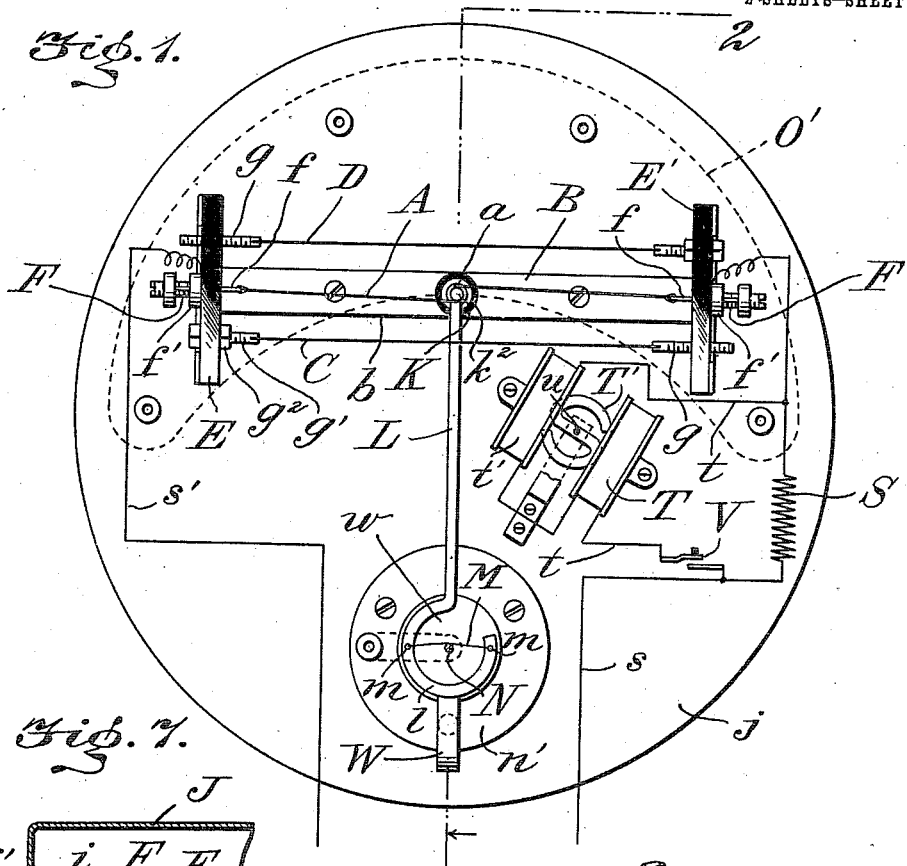
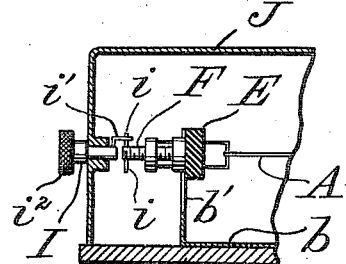
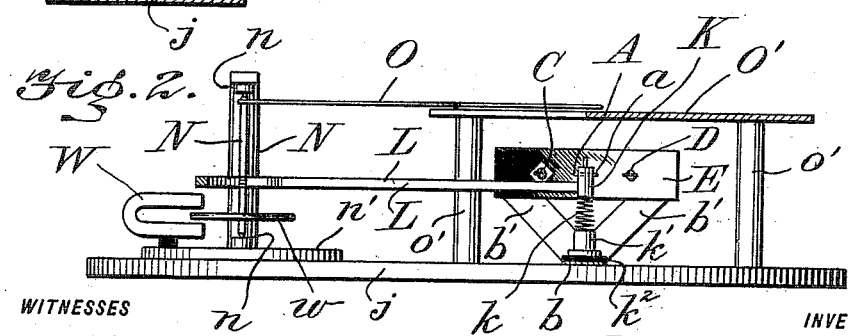

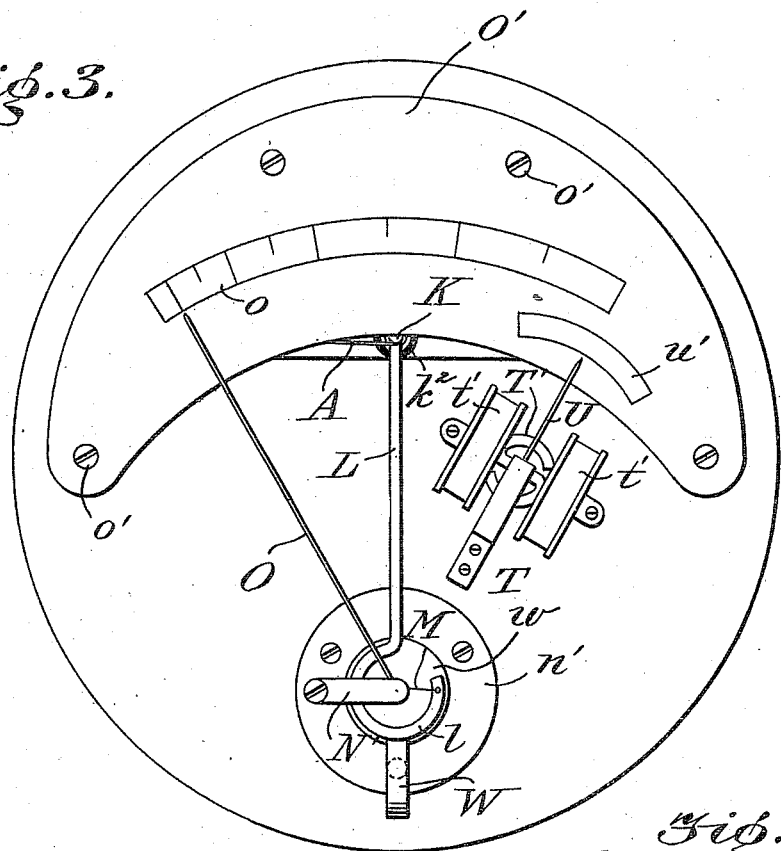
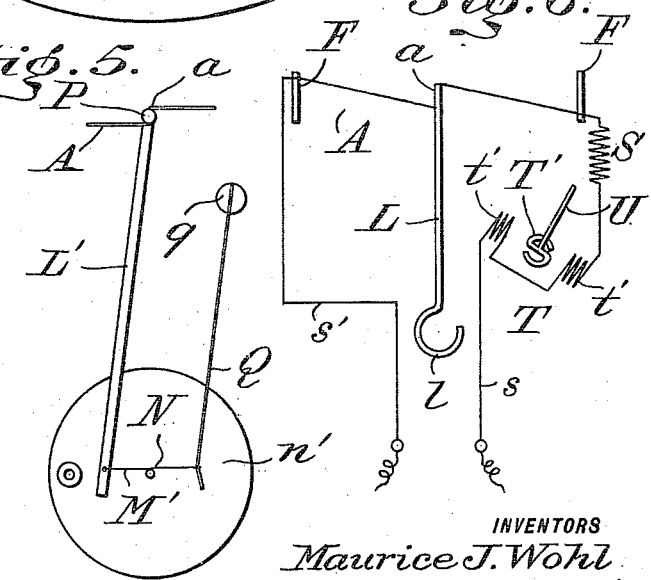

MAURICE J. WOHL, OF NEW YORK, AND HARRY HERTZBERG, OF BROOKLYN, NEW YORK, ASSIGNORS TO ABBOT A. LOW, OF HORSESHOE, NEW YORK, MAURICE J. WOHL, OF NEW YORK, N. Y., AND HARRY HERTZBERG, OF BROOKLYN, NEW YORK, TRUSTEES.

ELECTRICAL MEASURING INSTRUMENT.

973,152.
Specification of Letters Patent.
Patented Oct. 18, 1910.

Application filed November 26, 1907. Serial No. 403,870.

*To all whom it may concern:*

Be it known that we, MAURICE J. WOHL and HARRY HERTZBERG, citizens of the United States, residing in the city of New York, boroughs of Manhattan and Brooklyn, counties of New York and Kings, respectively, and State of New York, have invented a certain new and useful Electrical Measuring Instrument, of which the following is a specification.

This invention is an electrical measuring instrument, more particularly an instrument of that class wherein a resistance element, such as a metallic wire or ribbon, is adapted to be heated by the passage of an electric current, in order that the expansion and contraction of said resistance element may be utilized for the operation of means adapted to indicate measurement of the volts and amperes of the current flowing.

Current measuring instruments of the foregoing type possess certain advantages in practice, due mainly to the fact that they can be used interchangeably in the measurement of alternating and direct currents, but so far as we are aware all prior instruments are open to the objection that the indicating needle vibrates back and forth a number of times before coming to a period of rest for indicating the measurement on a scale.

One of the chief advantages secured by our new instrument arises from the fact that the index or needle moves promptly to an indicating position, without appreciable fluctuation, when the current is admitted to said instrument, whereby the instrument is rendered "dead beat."

Important features connected with our new instrument are that the parts are simple in construction, easily adjusted in course of manufacture, capable of quick repair and adjustment when in service, and reliable and efficient in use.

With the compensating members are associated adjusting means for straining them lengthwise and individually, thus providing for equalizing the strain on the frame. A separate adjusting device is provided for the resistance member to take up slack therein, and if preferred we may employ means operated externally of the meter casing for operating said adjusting device. By thus providing a plurality of individually adjustable compensating members positioned at the respective sides of the resistance member, a more accurate equalization of the strain upon the frame and consequently a more delicate adjustment of the resistance member is effected than has heretofore been possible in the known instruments which rely for their adjustment upon a single compensating means.

In the accompanying drawings, we have illustrated different practical embodiments of the invention, but the constructions shown therein are to be understood as illustrative, only, and not as defining the limits of the invention.

Figure 1 is a plan view showing one form of our invention. Fig. 2 is a vertical cross section on the line 2—2 of Fig. 1. Fig. 3 is a plan view showing the mechanism of Fig. 1 in connection with appropriate indicating mechanism. Fig. 4 is a detail vertical section illustrating means for adjusting each end of the compensating members. Fig. 5 is a detail view showing another embodiment of the invention. Fig. 6 is a diagrammatic view illustrating the circuit through the hot wire member and a polarity indicator. Fig. 7 is a detail view illustrating means operated externally to the meter casing for adjusting a tension means associated with the hot wire.

A indicates a current-carrying resistance member or hot wire. This member or wire may be composed of any suitable or appropriate material, and it is supported in a proper frame, B. The frame is shown as consisting of a base bar, $b$, which is provided at each end with up standing arms, $b'$, the whole being in one integral piece of metal, although it will be understood that any other form of frame for supporting the resistance member and the compensating members, C, D, may be substituted for the particular construction herein shown and described. The frame, B, supports insulating blocks, E, E', which are composed of appropriate material and are fastened to the arms, $b'$, at the respective ends of the frame, B, said insulating blocks being disposed in parallel relation to each other and at the respective ends of the resistance member, A, and the compensating members, C, D. Said compensating members, C, D, are composed, preferably, of the same material as the resistance member, A, and, furthermore, in one embodiment of the invention the members, A, C, and D, consist of fine metallic wires of the same diameter and length. The compensating members are disposed at the respective sides of the resistance member, in parallel relation thereto, and equidistant therefrom, but the special relation of the compensating members to the resistance member may, in some instances, be modified.

The resistance member, A, is connected with the insulating blocks, E, E', by means which, preferably, may be operated to strain said resistance member or put it under linear tension. As shown, each end of the resistance member is attached to a stem, $f$, of an adjusting screw, F, the latter having metallic contact with a collar or bushing, $f'$, said bushing or collar being supported in one of the insulating blocks and adapted to serve as the means for electrically connecting a conducting wire with the screw, F, whereby the current to be measured may flow through the bushing or collar and the resistance member, A. Each compensating wire, C, D, is fastened at its respective ends to the insulating blocks, E, E', by adjusting devices shown more particularly in Figs. 1 and 4. One end of each compensating member is fastened to a screw, $g$, which is threaded into one of said blocks, whereas the other end of the resistance member is attached to a headed screw, $g'$, having a check nut, $g^2$. The headed screw is fastened to one insulating block and fixed in position therein by the nut, $g^2$, whereas the other screw, $g$, passes through the other insulating block, and its end portion is exposed for the purpose of adjusting said screw and straining the compensating member. The detailed construction of the tension device for each compensating member and the resistance member A as well, may, however, be modified as shown in Fig. 4, wherein the end portion of the resistance or compensating member is attached to a yoke, H, which passes through the insulating block and is attached to a cross piece, $h$. In this cross piece operates the take up screw, $h'$, which is connected loosely to or swiveled in the insulating block, E, such swivel connection being formed by a plate, $h^2$, which is attached to the insulating block, E. It will be seen that the screw, $h'$, may be turned in the block, E; that the rotation of the screw in one direction will move the cross piece, $h$, and the yoke, H, to strain the resistance or compensating member without twisting it, the pull of the yoke, H, being in a rectilinear path, and that the screw, $h'$, is held firmly in place by the plate, $h^2$, and the insulating block, E. It is evident that the adjusting device shown in Fig. 4 may be used in connection with each compensating member, C, D, either at one end of said member, or at both ends thereof.

From the preceding description, it will be understood that the compensating members, C, D, are not adapted to carry any current, and, furthermore, that the compensating members are adapted to be strained or placed under tension in order to maintain the supporting frame in a rigid condition. Should any inequality in the expansion of the current-carrying member, A, be apparent, the adjusting devices for the compensating members must be operated to place the frame under proper tension. It is evident that the adjusting device for one member may be slackened, and the adjusting device for the other member tightened, or vice versa, or the adjusting device for both compensating members may be slackened or tightened as may be required, the several adjustments being independently performed. Furthermore, the adjusting screw or screws, F, may be slackened or tightened in order to strain the member, A, more or less, particularly for the purpose of so adjusting the current-carrying member, A, as to make the index or needle point to zero on the scale of the instrument. When the instrument is in use it may become necessary, owing to the distortion of the current-carrying member, A, to adjust it for the needle to indicate zero when no current is flowing. It is not desirable to remove the case of the instrument for this slight inaccuracy, and we have shown in Fig. 7 of the drawings one embodiment of means whereby the slight adjustment of the current-carrying member may be performed externally of the casing. In said figure, the screw, F, is shown as having the radial arms, $i$, $i$, which are disposed in the path of a bent finger, $i'$, on an adjusting spindle, I, the latter being mounted in the instrument case, J, for free rotation therein. The adjusting spindle passes through the case so that its headed end, $i^2$, is exposed for convenient access, and said spindle, I, is preferably in coaxial relation to the screw, F. It is evident that the spindle, I, may be rotated to bring the finger, $i'$, into engagement with one arm, $i$, or the other, and thus the screw, F, is adapted to be turned for the purpose of placing the current-carrying member, A, under the required tension.

The current-carrying member or hot wire, A, in the present invention is provided with an offset at $a$, and from this offset portion of said member or hot wire extends a needle operating member, L. In the preferred embodiment of the invention, the offset part, $a$, passes through an opening in a plug or block, K, the latter being situated at or about the middle part of said member or hot wire, A, so as to make the latter consist of two lengths which, as shown in Fig. 1, are out of alinement with each other. The plug or block, K, is mechanically supported by a spiral spring, $k$, which is attached to a foot piece, $k'$, the latter being insulated electrically at $k^2$ from the base bar, $b$, of the supporting frame. The spring, $k$, is shown as a coiled spring arranged to mechanically support the block, K, and the needle operating arm, L, whereby the current-carrying member or hot wire, A, is relieved from the weight of the plug, K, and the arm, L, thus overcoming any tendency of the member, A, to sag at its middle. The spring, $k$, serves another important function in that it is placed under tension for the purpose of exerting tension on the block, K, by turning it, and thus the block, K, acts on the offset, $a$, of the member, A, for the purpose of automatically taking up slack therein, whereby the member, A, is placed under the tension of an automatic device.

The mechanical support and tension device just described is in metallic contact with the current-carrying member, but the foot plug, $k'$, is insulated from the frame and casing to prevent a short circuit.

The needle operating arm, L, is supported at one end by the block, K, to which said arm is fastened directly. The other end of the arm is provided with, or bent to form, a curved finger, $l$, the latter being approximately circular. Said arm, L, is shown in Figs. 1, 3 and 6 as having its free end bent into the approximately circular finger, the finger being continuous with the arm. If desired, the finger may be bent into a complete circle, but this is not necessary. Across the finger is stretched a flexible connection, such as a cord or thread, M, the ends of which are fastened at $m$ to the curved finger, and at a point intermediate of its length this flexible connection is wrapped around a shaft, N. Said shaft is supported in suitable bearings, $n$, such as jeweled bearings, which are provided in a supporting frame, N', having a base plate, $n'$, fixed to the bottom, $j$, of the meter casing, J. The needle shaft, N, is provided with an index or pointer, O, which is shown in Figs. 2 and 3 as adapted to traverse a scale, $o$, that is provided on a dial plate, O', the same being arranged over the hot wire member, A, in which position it is supported by the posts, $o'$, which are fastened to the bottom, $j$.

It is not desired to limit the invention to the block, K, and the tension spring, $k$, therefor, and in Fig. 5, we have shown another form of construction wherein the needle operating arm, L', is provided at one end with a piece, P, which is the equivalent of the plug or block, K. This piece, P, may have an opening for the accommodation of the offset part, $a$, of the current-carrying member, A, or, if desired, the current-carrying member may be composed of two lengths, the adjacent ends of which are fastened to opposite sides of the piece, P. To the other end of the arm, L', is attached one end of the flexible connection, M', which is coiled or wrapped around the needle staff, M, and the other end of this flexible connection, M', is attached to a spring, Q, the latter being shown as the leaf spring anchored at one end in a post, $q$, see Fig. 5.

From the preceding description, it will be understood that when current is admitted to the member or hot wire, A, the latter becomes heated quickly and is expanded proprotionately to the current flowing. The needle indicates normally at zero on the dial, but the expansion of the member, A, causes the offset, $a$, therein to turn the arm, L, or L', whereby the flexible connection, M or M' is operated to turn the needle shaft, N, thus moving the needle, O, relative to the dial plate, and indicating thereon the measurement of the current flowing through the member, A.

In Figs. 1 and 6 of the drawings, we have shown the circuit connections in which there is included a polarity indicator, T. The lead, $s$, includes a resistance coil, S, and is connected with one of the adjusting devices, F, for the member, A. The other lead, $s'$, is attached to the other adjusting device for said member, A, thus making provision for the inflow and outflow of the current. The polarity indicator is in a shunt, $t$, from the lead, $s$, and, as shown, this indicator consists of the coils, $t'$, and the armature, T', the latter being carried by a shaft, $u$, which is equipped with a pointer, U, adapted to traverse the dial, $u'$. The armature, T', is shown as an approximately S-shaped permanent magnet having poles of opposite polarity at its respective ends, and these end portions of the armature are normally in positions to enter the magnetic field of the coils, $t'$. The shunt circuit includes a suitable switch, V, by which the circuit may be closed on the admission of the current for the purpose of indicating the direction of the current by the needle, U, moving relative to the dial, $u'$. In Fig. 6 of the drawings, we have shown the polarity indicator, T, normally in the meter circuit, the switch, V, being omitted.

The hot wire or current-carrying member provided with an offset at its middle portion operates on the principle of expansion and contraction in turning the needle-operating member, and in the construction shown, said offset member exerts a pull in opposite directions simultaneously on the needle operating arm. It is not desired, however, to restrict the invention to a current-carrying member constructed and operating as described, for the reason that the member may operate to exert stress in one direction when expanded or contracted. It will be evident that such stress in one direction only might be resorted to without departing from the scope of our invention, by simply substituting for either segment of the resistance member A a current carrying member of appropriate length which would be unaffected by the passage of current therethrough.

Our meter may be used for measuring volts or amperes, or it may be used in the construction of multiple unit meters, as well as for other purposes.

With the instrument we prefer to combine a retarding or dampening mechanism which is adapted to restrain the needle or index from undue and too rapid movement in case of an overload or excess of current. The dampener is, preferably, a magnetic device comprising a permanent magnet W, between the poles of which operates a movable element $w$, the latter being carried by the needle shaft N.

Having thus fully described the invention, what we claim as new, and desire to secure by Letters Patent is:

1. In an instrument of the class described, a current-carrying member provided with an offset, and an automatic slack take up comprising a torsion spring coöperating with said member and supporting it mechanically from sagging.

2. In an instrument of the class described, a current-carrying member having an offset, means for varying the normal tension thereof, a block engaging the offset, an indicator member actuated by the block, and a take up spring coöperating with the block, said spring supporting said block.

3. In an instrument of the class described, a current-carrying member having an offset, a block engaging the offset, an indicator member actuated by the block, and a take up spring coöperating with the block, said spring also acting to support the member against sagging under the weight of the block and the indicator member.

4. In an instrument of the class described, a case, a flexible member therein adapted to be placed under tension, means including a screw, for exerting a rectilinear pull on the said member without torsion, a finger on said screw, a rotating element carried by the case and having an operating part externally thereof, and a finger on said rotating element adapted to engage said first-named finger.

In testimony whereof we have signed our names to this specification in the presence of two subscribing witnesses.

MAURICE J. WOHL.
HARRY HERTZBERG.

Witnesses:
MARGARET C. POWELL,
H. I. BERNHARD.